(12) United States Patent
Zhao et al.

(10) Patent No.: US 11,240,501 B2
(45) Date of Patent: Feb. 1, 2022

(54) L-TYPE PARTITIONING TREE

(71) Applicant: TENCENT AMERICA LLC, Palo Alto, CA (US)

(72) Inventors: Xin Zhao, San Diego, CA (US); Liang Zhao, Sunnyvale, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/087,918

(22) Filed: Nov. 3, 2020

(65) Prior Publication Data

US 2021/0211660 A1 Jul. 8, 2021

Related U.S. Application Data

(60) Provisional application No. 62/958,417, filed on Jan. 8, 2020.

(51) Int. Cl.
*H04N 11/02* (2006.01)
*H04N 19/119* (2014.01)
*H04N 19/96* (2014.01)
*H04N 19/44* (2014.01)
*H04N 19/176* (2014.01)
*H04N 19/196* (2014.01)

(52) U.S. Cl.
CPC ......... *H04N 19/119* (2014.11); *H04N 19/176* (2014.11); *H04N 19/196* (2014.11); *H04N 19/44* (2014.11); *H04N 19/96* (2014.11)

(58) Field of Classification Search
CPC .................................................. H04N 19/119
USPC ........................................ 375/240.01–240.29
See application file for complete search history.

(56) References Cited

U.S. PATENT DOCUMENTS

| | | | |
|---|---|---|---|
| 2010/0310186 A1* | 12/2010 | Liu | H04N 19/176 382/239 |
| 2012/0155540 A1 | 6/2012 | Jagannathan | |
| 2013/0089265 A1* | 4/2013 | Yie | G06T 9/004 382/238 |
| 2014/0177713 A1 | 6/2014 | Yuan et al. | |
| 2014/0192876 A1 | 7/2014 | Yie et al. | |
| 2016/0234503 A1 | 8/2016 | Konieczny | |
| 2017/0244964 A1* | 8/2017 | Liu | H04N 19/119 |
| 2017/0347128 A1 | 11/2017 | Panusopone et al. | |
| 2019/0020888 A1* | 1/2019 | Liu | H04N 19/593 |
| 2020/0014947 A1* | 1/2020 | Abe | H04N 19/105 |

OTHER PUBLICATIONS

International Search Report dated Mar. 16, 2021 in Application No. PCT/US2021/012498.
Written Opinion of the International Searching Authority dated Mar. 16, 2021 in Application No. PCT/US2021/012498.

(Continued)

*Primary Examiner* — Leron Beck
(74) *Attorney, Agent, or Firm* — Sughrue Mion, PLLC

(57) ABSTRACT

An approach for encoding/decoding video data including obtaining video data; parsing the obtained video data to obtain partitioning parameters; obtaining a partitioned coding block based on the partitioning parameters; and decoding the obtained video data based on the partitioned coding block. The partitioned coding block may be partitioned into a rectangular partition and at least one non-rectangular partition.

21 Claims, 15 Drawing Sheets

(56) References Cited

OTHER PUBLICATIONS

Il-Koo Kim et al., "Block Partitioning Structure in the HEVC Standard", IEEE Transactions on Circuts and Systems for Video Technology, vol. 22, No. 12, Dec. 2012, pp. 1697-1706 (10 pages total).

Benjamin Bross et al., "Versatile Video Coding (Draft 7)", Joint Video Experts Team (JVET) of ITU-T SG 16 WP 3 and ISO/IEC JTC 1/SC 29/WG 11, 16th Meeting: Geneva, CH, Oct. 1-11, 2019, JVET-P2001vE, 492 pages.

Yue Chen et al., "An Overview of Core Coding Tools in the AV1 Video Codec", IEEE, PCS, 2018, pp. 41-45 (5 pages).

Peter de Rivaz et al., AV1 Bitstream & Decoding Process Specification, Version 1.0.0 with Errata 1, The Alliance for Open Media, 2018, 681 pages.

* cited by examiner

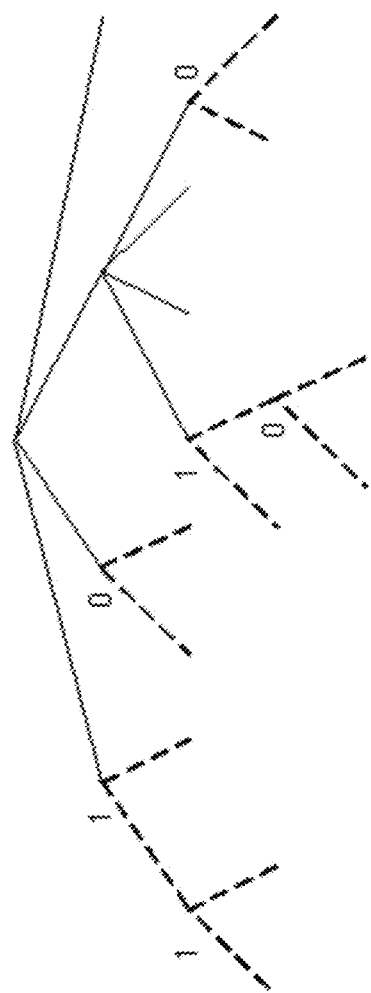
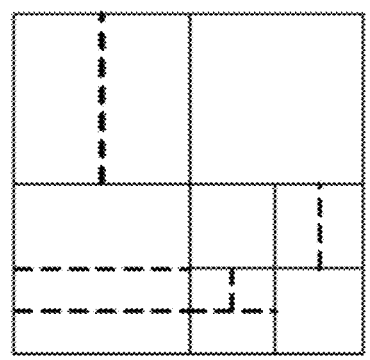
FIG. 3B
FIG. 3A

L-TYPE PARTITIONING TREE

CROSS-REFERENCE TO RELATED APPLICATION

This application claims priority under 35 U.S.C. § 119 to U.S. Provisional Application No. 62/958,417, filed on Jan. 8, 2020, in the United States Patent & Trademark Office, the disclosure of which is incorporated herein by reference in its entirety.

FIELD

This disclosure relates generally to the field of data processing, and more particularly to video encoding and/or decoding involving an L-shaped partitioning tree method.

BACKGROUND

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on 12 Sep. 2014, and Cisco's Thor was published on 11 Aug. 2015. Building on the codebase of VP9, AV1 incorporates additional techniques, several of which were developed in these experimental formats. The first version 0.1.0 of the AV1 reference codec was published on 7 Apr. 2016. The Alliance announced the release of the AV1 bitstream specification on 28 Mar. 2018, along with a reference, software-based encoder and decoder. On 25 Jun. 2018, a validated version 1.0.0 of the specification was released. On 8 Jan. 2019 a validated version 1.0.0 with Errata 1 of the specification was released. The AV1 bitstream specification includes a reference video codec. AOMedia Video 2 (AV2) is currently under development.

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to explore the potential of developing the next video coding standard beyond HEVC In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as Joint Video Expert Team.

SUMMARY

Embodiments relate to a method, system, and computer readable medium for encoding and/or decoding video data. According to one aspect, a method for encoding and/or decoding video data is provided. The method may include obtaining video data; parsing the obtained video data to obtain partitioning parameters; obtaining a partitioned coding block based on the partitioning parameters; and decoding the obtained video data based on the partitioned coding block. The partitioned coding block may be partitioned into a rectangular partition and at least one non-rectangular partition.

According to one aspect, a device for encoding and/or decoding video data is provided. The device may include at least one memory configured to store program code; and at least one processor configured to read the program code and operate as instructed by the program code, the program code including: first obtaining code configured to cause the at least one processor to obtain video data; parsing code configured to cause the at least one processor to parse the obtained video data to obtain partitioning parameters; second obtaining code configured to cause the at least one processor to obtain a partitioned coding block based on the partitioning parameters; and decoding code configured to cause the at least one processor to decode the obtained video data based on the partitioned coding block. The partitioned coding block may be partitioned into a rectangular partition and at least one non-rectangular partition.

According to one aspect, a non-transitory computer-readable medium for encoding and/or decoding video data is provided. The non-transitory computer-readable medium may store instructions including one or more instructions that, when executed by one or more processors of a device for video decoding, cause the one or more processors to: obtain video data; parse the obtained video data to obtain partitioning parameters; obtain a partitioned coding block based on the partitioning parameters; and decode the obtained video data based on the partitioned coding block. The partitioned coding block may be partitioned into a rectangular partition and at least one non-rectangular partition.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings:

FIGS. 3A-3B illustrates examples of a quadtree binary tree structure, according to at least one embodiment.

DETAILED DESCRIPTION

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to video encoding and decoding. The following described exemplary embodiments provide a system, method and computer program to, among other things, encode and/or decode video data using an extended quantizer for efficient compression of the video data. Therefore, some embodiments have the capacity to improve the field of computing by providing an extended quantizer in AV2.

As previously described, AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Currently the AV1 quantization step sizes have limited resolution. Although the step size range has increased, the valid range of Q_index is the same. This limitation in quantization step resolution is more evident for 10-bit and 12-bit internal bit depth, where the corresponding 8-bit step size (obtained using the q_idx) is scaled by 4 and 16 respectively. This can affect the granularity of bit rates that can be achieved by the codec. It may be advantageous, therefore, to increase quantization step size resolution by extending a range of a quantization index.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Figure 1:
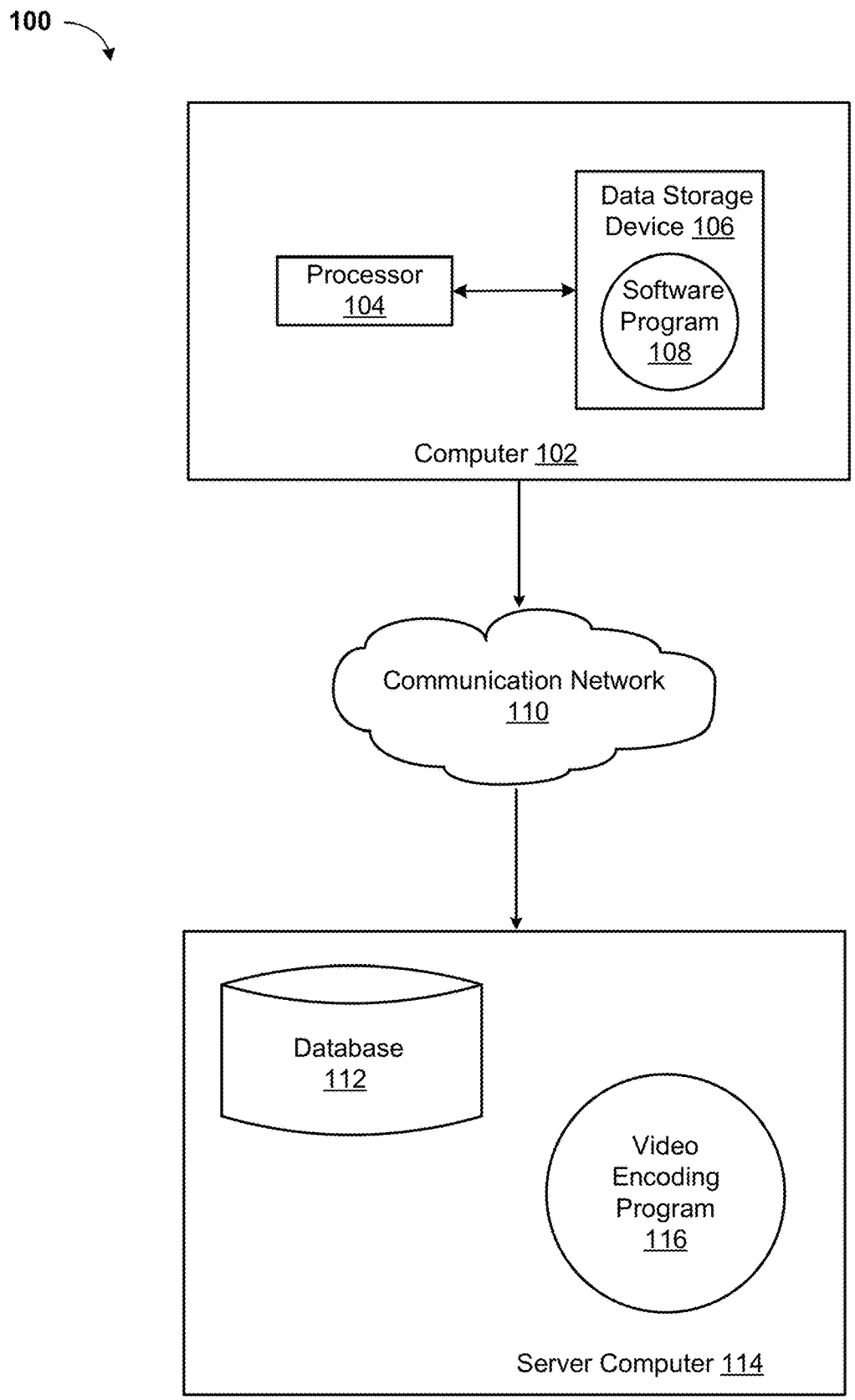
FIG. 1 illustrates a networked computer environment according to at least one embodiment.

Referring now to FIG. 1, a functional block diagram of a networked computer environment illustrating a video coding system 100 (hereinafter "system") for encoding and/or decoding video data according to exemplary embodiments such as those described herein. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 13 the computer 102 may include internal components 8000A and external components 9000A, respectively, and the server computer 114 may include internal components 8000B and external components 9000B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 14 and 15. The server computer 114 may also be located in a cloud computing deployment model, such as a private cloud, community cloud, public cloud, or hybrid cloud.

The server computer 114, which may be used for encoding video data is enabled to run a Video Encoding Program 116 (hereinafter "program") that may interact with a database 112. The Video Encoding Program method is explained in more detail below with respect to FIG. 4. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger video encoding program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set .of devices of system 100.

Figure 2:
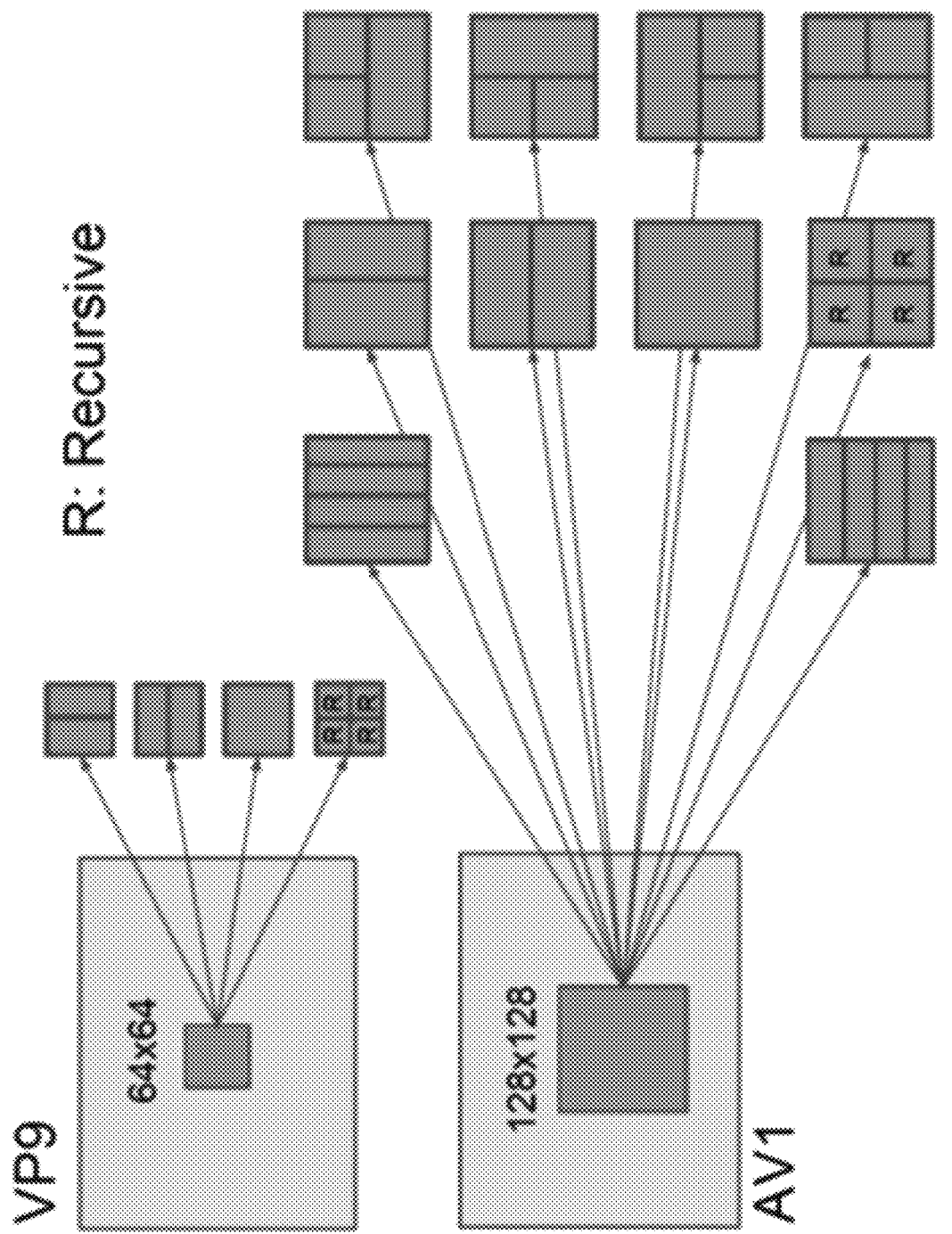
FIG. 2 illustrates an example of partition trees in VP9 and AV1, according to at least one embodiment.

FIG. 2 illustrates examples of block partitioning in VP9 and AV1. VP9 uses a 4-way partition tree starting from the 64×64 level down to 4×4 level, with some additional restrictions for blocks 8×8 and below as shown in the top half of FIG. 2. Note that partitions designated as R refer to as recursive in that the same partition tree is repeated at a lower scale until we reach the lowest 4×4 level.

AV1 not only expands the partition-tree to a 10-way structure as shown in the same figure, but also increases the largest size (referred to as superblock in VP9/AV1 parlance) to start from 128×128. Note that this includes 4:1/1:4 rectangular partitions that did not exist in VP9. None of the rectangular partitions can be further subdivided. In addition, AV1 adds more flexibility to the use of partitions below 8×8 level, in the sense that 2×2 chroma inter prediction now becomes possible on certain cases.

In HEVC, a coding tree unit (CTU) is split into coding units (CUs) by using a quadtree structure denoted as coding tree to adapt to various local characteristics. The decision on whether to code a picture area using inter-picture (temporal) or intra-picture (spatial) prediction is made at the CU level. Each CU can be further split into one, two or four prediction units (PUs) according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure like the coding tree for the CU. A key feature of the HEVC structure is that it has the multiple partition conceptions including CU, PU, and TU. In HEVC, a CU or a TU can only be square shape, while a PU may be square or rectangular shape for an inter predicted block. In HEVC, one coding block may be further split into four square sub-blocks, and transform is performed on each sub-block, i.e., TU. Each TU can be further split recursively (using quadtree split) into smaller TUs, which is called Residual Quad-Tree (RQT).

At picture boundary, HEVC employs implicit quad-tree split so that a block will keep quad-tree splitting until the size fits the picture boundary.

In HEVC, a CTU is split into CUs by using a quadtree structure denoted as coding tree to adapt to various local characteristics. The decision on whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree (QT) structure like the coding tree for the CU. One of key features of the HEVC structure is that it has the multiple partition conceptions including CU, PU, and TU.

The quadtree binary tree (QTBT) structure removes the concepts of multiple partition types, i.e. it removes the separation of the CU, PU and TU concepts, and supports more flexibility for CU partition shapes. In the QTBT block structure, a CU can have either a square or rectangular shape. As shown in FIGS. 3A-3B, a coding tree unit (CTU) is first partitioned by a quadtree structure. The quadtree leaf nodes are further partitioned by a binary tree (BT) structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters may be defined for the QTBT partitioning scheme:
CTU size: the root node size of a quadtree, the same concept as in HEVC
MinQTSize: the minimum allowed quadtree leaf node size
MaxBTSize: the maximum allowed binary tree root node size
MaxBTDepth: the maximum allowed binary tree depth
MinBTSize: the minimum allowed binary tree leaf node size In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBT-Size, no further vertical splitting is considered. The leaf nodes of the binary tree are further processed by prediction and transform processing without any further partitioning. In the JEM, the maximum CTU size is 256×256 luma samples.

FIG. 3A illustrates an example of block partitioning by using QTBT, and FIG. 3B illustrates the corresponding tree representation. The solid lines indicate quadtree splitting and dotted lines indicate binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the flexibility for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT as implemented in the JEM-7.0, these restrictions are removed.

Figure 4B:
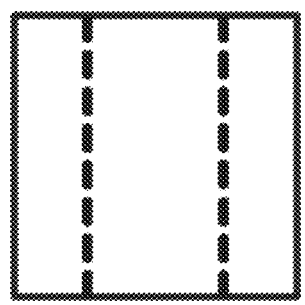
FIGS. 4A-4B illustrate examples of triple tree partitioning, according to at least one embodiment.
Figure 4A:
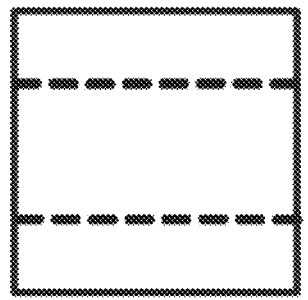

In VVC, a Multi-type-tree (MTT) structure is included, which further adds the horizontal and vertical center-side triple-trees on top of QTBT, as shown in FIGS. 4A-4B. For example, FIG. 4A illustrates an example of vertical center-side triple-tree partitioning, and FIG. 4B illustrates an example of horizontal center-side triple-tree partitioning Benefits of triple-tree partitioning may include that, as a complement to quad-tree and binary-tree partitioning, triple-tree partitioning is able to capture objects which are located in a block center while quad-tree and binary-tree are always splitting along block center. In addition, the width and height of the partitions of the proposed triple trees are always, power of 2 so that no additional transforms are needed.

The design of two-level tree is mainly motivated by complexity reduction. Theoretically, the complexity of traversing a tree is TAD, where T denotes the number of split types, and D is the depth of tree.

The block partitioning in related art codecs may restrict the image data being partitioned into one or multiples rectangular blocks, and samples within each rectangular block are coded together as one coding unit, or for example one coding block. A new block partitioning method which does not overlap with existing block partitioning patterns may bring additional coding gain. Embodiments may relate to a new block partitioning which supports non-rectangular block partitioning patterns are proposed.

Figure 5:
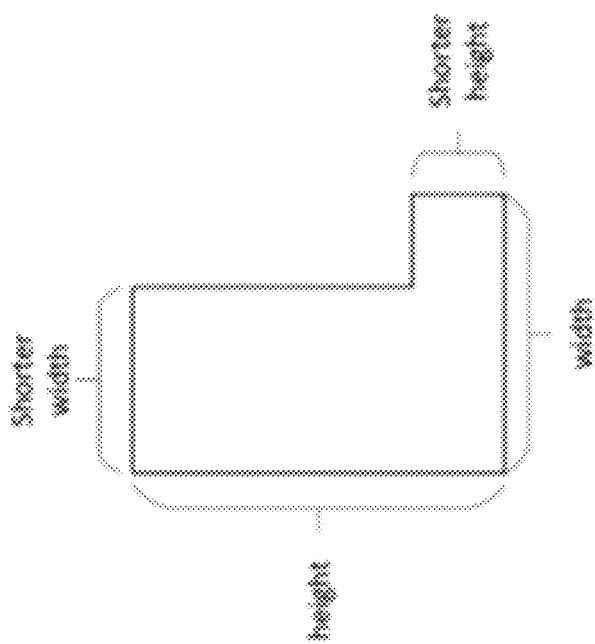
FIG. 5 illustrates an example of an L-shaped partition, according to at least one embodiment.
Figure 6B:
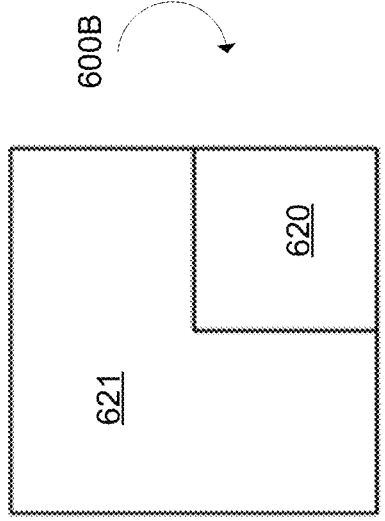
FIGS. 6A-6D illustrate examples of partitioning involving L-shaped partitions, according to at least one embodiment.
Figure 6D:
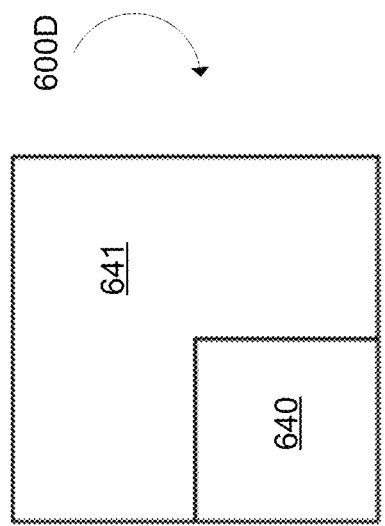
Figure 6A:
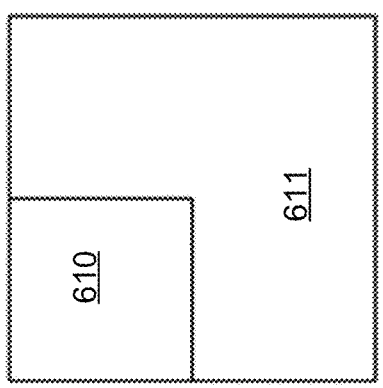
Figure 6C:
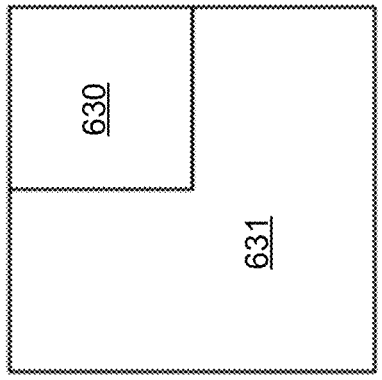
Figure 7A:
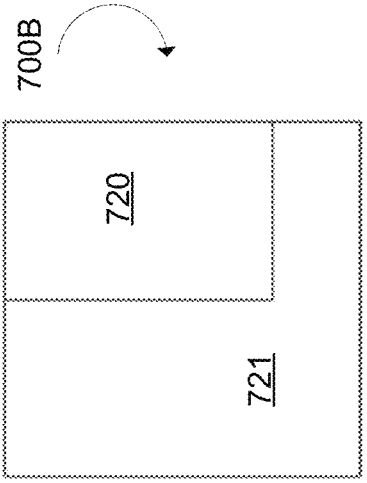
FIGS. 7A-7D illustrate examples of partitioning involving L-shaped partitions, according to at least one embodiment.
Figure 7B:
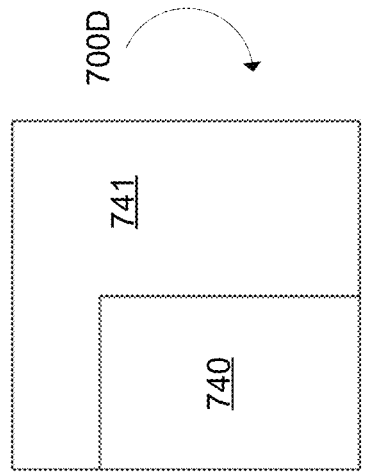
Figure 7C:
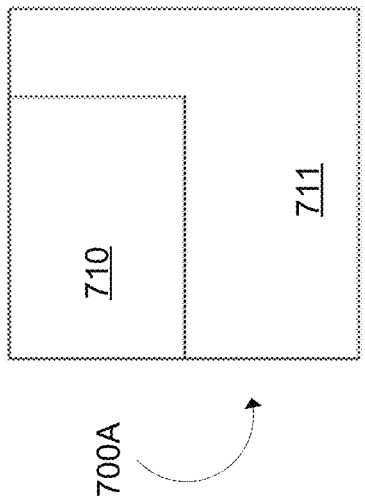
Figure 7D:
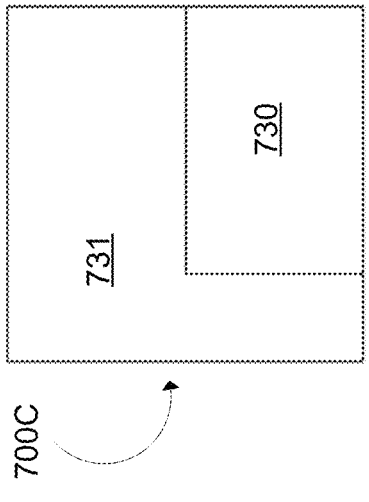
Figure 8A:
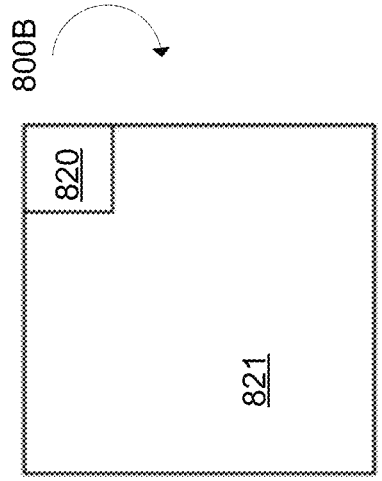
FIGS. 8A-8D illustrate examples of partitioning involving L-shaped partitions, according to at least one embodiment.
Figure 8B:
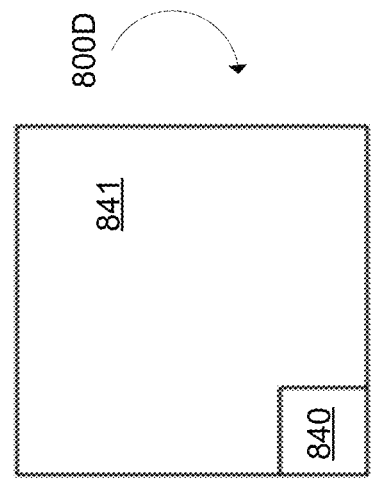
Figure 8C:
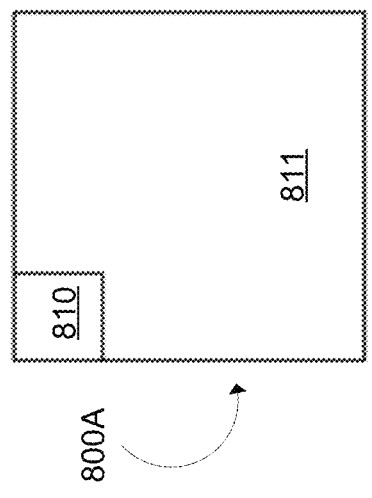
Figure 8D:
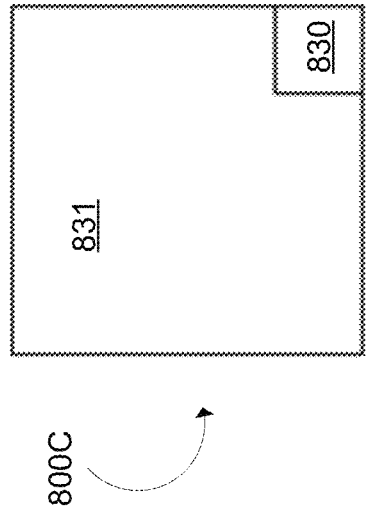
Figure 9A:
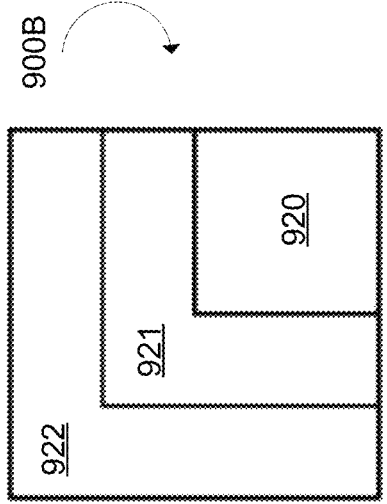
FIGS. 9A-9D illustrate examples of partitioning involving L-shaped partitions, according to at least one embodiment.
Figure 9B:
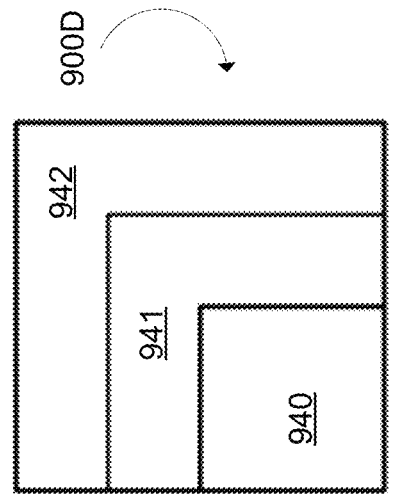
Figure 9C:
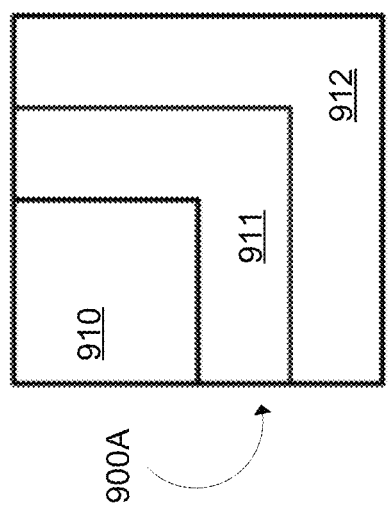
Figure 9D:
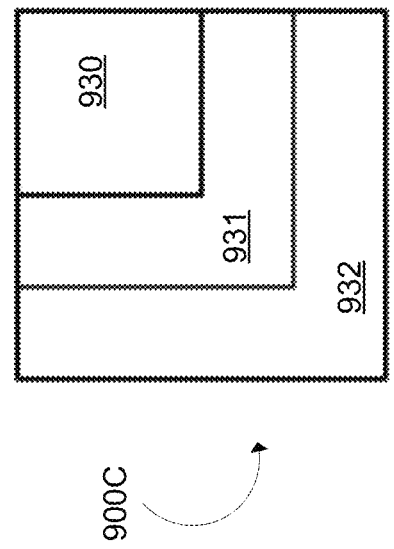
Figure 10A:
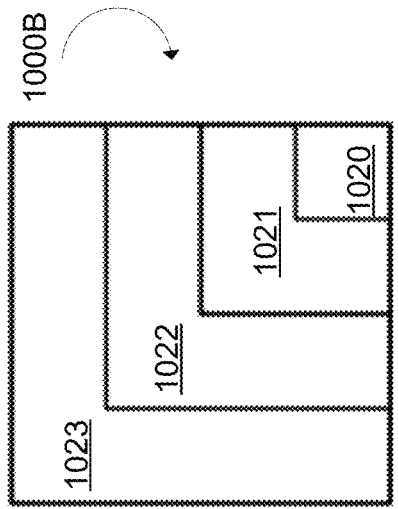
FIGS. 10A-10D illustrate examples of partitioning involving L-shaped partitions, according to at least one embodiment.
Figure 10B:
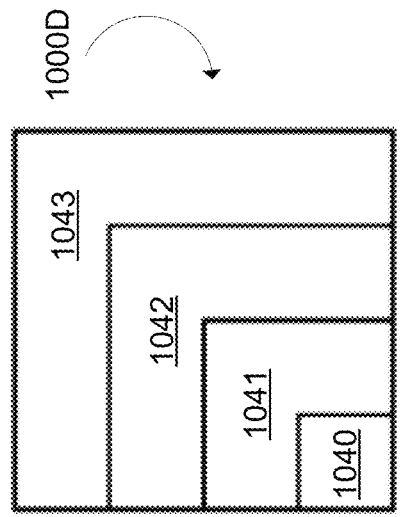
Figure 10C:
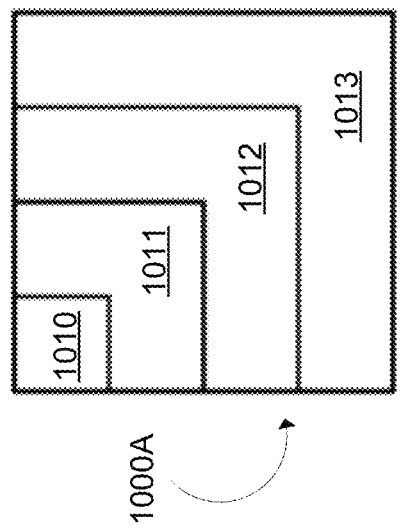
Figure 10D:
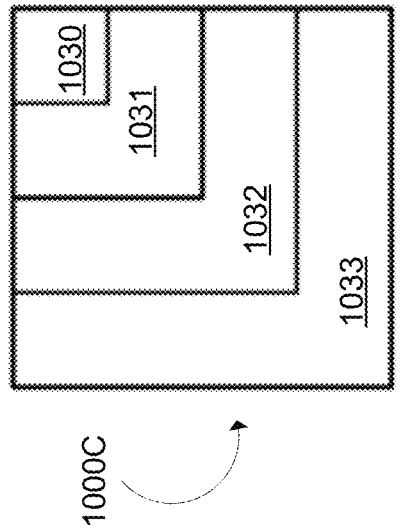

Embodiments may be used separately or combined in any order. FIG. 5 illustrates an example of an L-shaped (or L-Type) partition, according to at least one embodiment. In embodiments, a rotated L-shaped partition may also be regarded as an L-shaped partition. As can be seen in FIG. 5, an L-shaped partition may include, for example, a width, a height, a shorter width and a shorter height, as indicated.

In embodiments, an L-Type coding block partitioning method may partition one coding block into one rectangular partition and one or multiple L-Type partitions.

FIGS. 6A-6D illustrate examples of coding blocks 600A-600D which are partitioned using L-shaped partitioning, according to embodiments. As can be seen in FIGS. 6A-6D, each of coding blocks 600A-600D are partitioned into one square partition, for example partitions 610, 620, 630, and 640, as well as one L-shaped partition, for example partitions 611, 621, 631, and 641.

In embodiments such as the embodiments shown in FIGS. 6A-6D, blocks 600A-600D may each be partitioned into two partitions, in which one is a quarter-size (both width and height is half size of the width and height of the block) rectangular block, for example partitions 610, 620, 630, and 640, and the other is an L-shaped partition which covers ¾ of the area size of the block, for example partitions 611, 621, 631, and 641.

FIGS. 7A-7D illustrate examples of coding blocks 700A-700D which are partitioned using L-shaped partitioning, according to embodiments. As can be seen in FIGS. 7A-7D, each of coding blocks 700A-700D are partitioned into one rectangular partition, for example partitions 710, 720, 730, and 740, as well as one L-shaped partition, for example partitions 711, 721, 731, and 741.

In embodiments such as the embodiments shown in, blocks 700-700D may be partitioned into two partitions, in which one is the rectangular block with a different aspect ratio as the block, for example partitions 710, 720, 730, and 740, and the other is an L-shaped partition, for example partitions 711, 721, 731, and 741.

FIGS. 8A-8D illustrate examples of coding blocks 800A-800D which are partitioned using L-shaped partitioning, according to embodiments. As can be seen in FIGS. 8A-8D, each of coding blocks 800A-800D are partitioned into one square partition, for example partitions 810, 820, 830, and 840, as well as one L-shaped partition, for example partitions 811, 821, 831, and 841.

In embodiments such as the embodiments shown in FIGS. 8A-8D, blocks 800A-800D may be partitioned into two partitions, in which one is a rectangular block with a same block aspect ratio (e.g., 1:4, 1:8, 1:16) of the block, for example partitions 810, 820, 830, and 840, and the other is an L-Type partition which covers the remaining area of the block, for example partitions 811, 821, 831, and 841. In FIGS. 8A-8D, the width and height of each of partitions 810, 820, 830, and 840 may be one quarter of the width and height of the each of blocks 800A-800D, i.e., the block aspect ratio may be 1:4.

In embodiments, a block may be partitioned into more than two partitions. For example, a block may be partitioned into a rectangular block with same block aspect ratio of the block, and a plurality of L-shaped partitions.

FIGS. 9A-9D illustrate examples of coding blocks 900A-900D which are partitioned using L-shaped partitioning, according to embodiments. As can be seen in FIGS. 9A-9D, each of coding blocks 900A-900D are partitioned into one square partition, for example partitions 910, 920, 930, and 940, as well as two L-shaped partition, for example partitions 911, 912, 921, 922, 931, 932, 941, and 942.

In embodiments such as the embodiments shown in FIGS. 9A-9D, blocks 900A-900D may be partitioned into three partitions, in which one is a rectangular block with same block aspect ratio of the block, for example partitions 910, 920, 930, and 940, and the other two are L-Type partitions, for example partitions 911, 912, 921, 922, 931, 932, 941, and 942.

FIGS. 10A-10D illustrate examples of coding blocks 1000A-1000D which are partitioned using L-shaped partitioning, according to embodiments. As can be seen in FIGS. 10A-10D, each of coding blocks 1000A-1000D are partitioned into one square partition, for example partitions 1010, 1020, 1030, and 1040, as well as three L-shaped partition, for example partitions 1011, 1021, 1022, 1023, 1031, 1032, 1033, 1041, 1042, and 1043.

In embodiments such as the embodiments shown in FIGS. 10A-10D, blocks 1000A-1000D may be partitioned as four partitions, in which one is a rectangular block with same block aspect ratio of the block A, for example partitions 1010, 1020, 1030, and 1040, and the other three are all L-Type partitions, for example partitions 1011, 1021, 1022, 1023, 1031, 1032, 1033, 1041, 1042, and 1043.

In embodiments, the shorter width of each L-Type partition such as partitions 1011, 1021, 1022, 1023, 1031, 1032, 1033, 1041, 1042, and 1043 may have a same value, for example ¼ of whole block width.

In another example, the shorter height of each L-Type partition such as partitions 1011, 1021, 1022, 1023, 1031, 1032, 1033, 1041, 1042, and 1043 may have a same value, for example ¼ of whole block height.

In embodiments, the rectangular partitions derived using the above proposed L-shaped partitioning, for example partitions 610, 620, 630, 640, 710, 720, 730, 740, 810, 820, 830, 840, 910, 920, 930, 940, 1010, 1020, 1030, and 1040, may be further partitioned. For example, the regular coding tree split method defined in AV1 (binary tree split, quadtree split, T-type) and VVC (binary tree split, ternary tree split and quadtree split) can be further applied to the rectangular partitions.

In embodiments, each of the L-shape partitions discussed above, for example partitions 611, 621, 631, 641, 711, 721, 731, 741, 811, 821, 831, 841, 911, 912, 921, 922, 931, 932, 941, 942, 1011, 1021, 1022, 1023, 1031, 1032, 1033, 1041, 1042, and 1043, may be further partitioned.

Figure 11A:
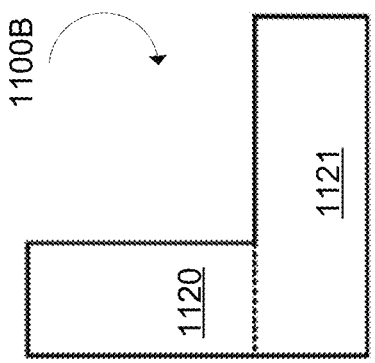
FIGS. 11A-11D illustrate examples of partitioning involving L-shaped partitions, according to at least one embodiment.
Figure 11B:
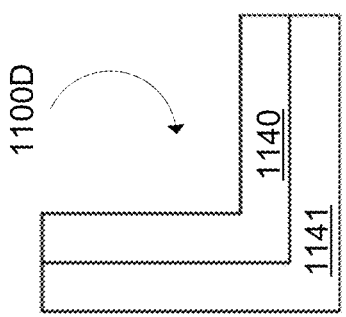

FIGS. 11A-11B illustrate examples of such further partitioning, according to embodiments.

For example, as shown in FIGS. 11A-11B, L-shaped partitions 1100A and 1100B may each be further partitioned into two rectangular partitions, for example partitions 1110, 1111, 1120, and 1121.

Figure 11C:
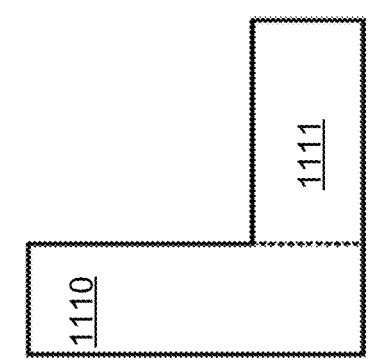

As another example, as shown in FIG. 11C, L-shaped 1100C may be further partitioned into three rectangular partitions, for example partitions 1130, 1131, and 1132.

Figure 11D:
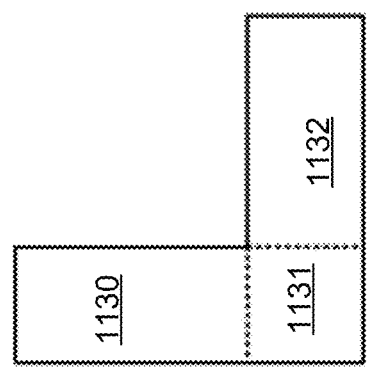

As another example, as shown in FIG. 11D, L-shaped 1100D may be further partitioned into L-shaped partitions, for example partitions 1140 and 1141.

In embodiments, L-shaped partitions may be associated with zero residuals.

In embodiments, the shorter width and shorter height of an L-shaped partition must be a power of 2 multiple of the block dimensions (for example ⅛, ¼, ½).

In one embodiment, the width, height, shorter width and shorter height of an L-shaped partition must all be multiples of the block dimensions (for example ⅛, ¼, ½).

Figure 12:
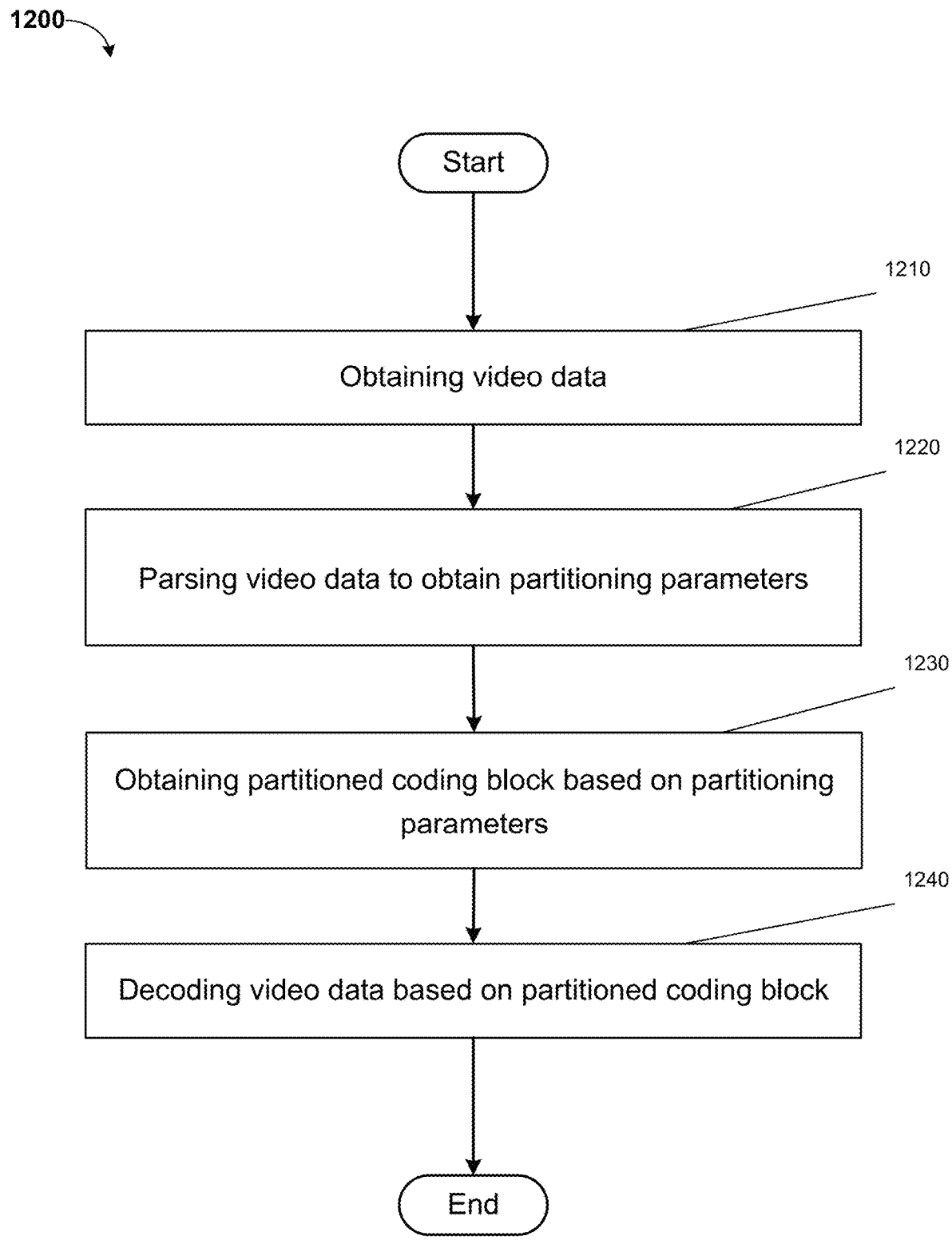
FIG. 12 is an operational flowchart illustrating the steps carried out by a program that codes video data, according to at least one embodiment.

Referring now to FIG. 12, an operational flowchart illustrating the steps of a method 90000 for encoding and/or decoding video data is depicted. In some implementations, one or more process blocks of FIG. 4 may be performed by the computer 102 (FIG. 1) and the server computer 114 (FIG. 1). In some implementations, one or more process blocks of FIG. 4 may be performed by another device or a group of devices separate from or including the computer 102 and the server computer 114.

At 1210, the method 1200 includes obtaining video data.

At 1220, the method 1200 includes parsing the obtained video data to obtain partitioning parameters.

At 1230, the method 1200 includes obtaining a partitioned coding block based on the partitioning parameters. In embodiments, the partitioned coding block is partitioned into a rectangular partition and at least one non-rectangular partition.

At 1240, the method 1200 includes decoding the video data based on the partitioned coding block.

In one or more embodiments, the at least one non-rectangular partition may include at least one L-shaped partition.

In one or more embodiments, a length of a first side of the L-shaped partition may be equal to a height of the partitioned coding block, a length of a second side of the L-shaped partition may be equal to a width of the partitioned coding block, a length of a third side of the L-shaped partition may be equal to half of the height of the partitioned coding block, a length of a fourth side of the L-shaped partition may be equal to half of the width of the partitioned coding block, a length of a fifth side of the L-shaped partition may be equal to the half of the height of the partitioned coding block, and a length of a sixth side of the L-shaped partition may be equal to the half of the width of the partitioned coding block.

In one or more embodiments, the at least one L-shaped partition may include two L-shaped partitions.

In one or more embodiments, the at least one L-shaped partition may include three L-shaped partitions.

In one or more embodiments, the rectangular partition may be a square partition.

In one or more embodiments, a width of the square partition may be equal to half of a width of the partitioned coding block, and a height of the square partition may be equal to half of a height of the partitioned coding block.

In one or more embodiments, an aspect ratio of the at least one non-rectangular partition may be equal to an aspect ratio of the partitioned coding block.

In one or more embodiments, the rectangular partition may be further partitioned based on at least one of binary tree partitioning, ternary tree partitioning, quadtree partitioning, or T-type partitioning In one or more embodiments, the at least one non-rectangular partition may be further partitioned into a plurality of rectangular partitions.

It may be appreciated that FIG. 12 provides only an illustration of one implementation and does not imply any limitations with regard to how different embodiments may be implemented. Many modifications to the depicted environments may be made based on design and implementation requirements.

Figure 13:
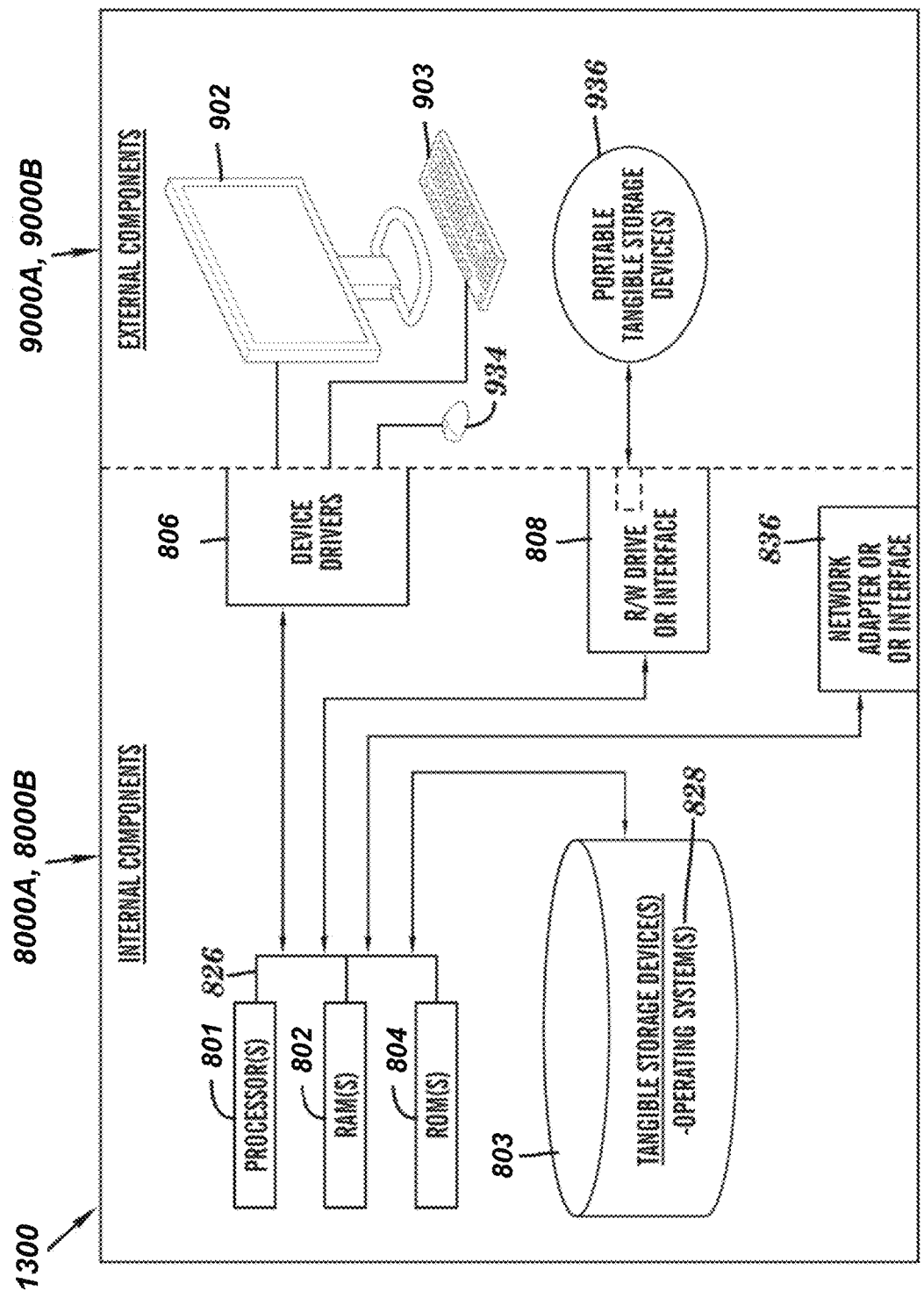
FIG. 13 is a block diagram of internal and external components of computers and servers depicted in FIG. 1 according to at least one embodiment.

FIG. 13 is a block diagram 1300 of internal and external components of computers depicted in FIG. 1 in accordance with an illustrative embodiment. It should be appreciated that FIG. 13 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 8000A,B and external components 9000A,B illustrated in FIG. 4. Each of the sets of internal components 8000 include one or more processors 801, one or more computer-readable RAMs 802 and one or more computer-readable ROMs 804 on one or more buses 826, one or more operating systems 828, and one or more computer-readable tangible storage devices 803.

Processor 801 is implemented in hardware, firmware, or a combination of hardware and software. Processor 801 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 801 includes one or more processors capable of being programmed to perform a function. Bus 826 includes a component that permits communication among the internal components 8000A,B.

The one or more operating systems 828, the software program 108 (FIG. 1) and the Video Encoding Program 116 (FIG. 1) on server computer 114 (FIG. 1) are stored on one or more of the respective computer-readable tangible storage devices 803 for execution by one or more of the respective processors 801 via one or more of the respective RAMs 802 (which typically include cache memory). In the embodiment illustrated in FIG. 13, each of the computer-readable tangible storage devices 803 is a magnetic disk storage device of an internal hard drive. Alternatively, each of the computer-readable tangible storage devices 803 is a semiconductor storage device such as ROM 804, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 8000A,B also includes a R/W drive or interface 808 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Video Encoding Program 116 (FIG. 1) can be stored on one or more of the respective portable computer-readable tangible storage devices 936, read via the respective R/W drive or interface 808 and loaded into the respective hard drive 803.

Each set of internal components 8000A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Video Encoding Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Video Encoding Program 116 on the server computer 114 are loaded into the respective hard drive 803. The network may comprise copper wires, optical fibers, wireless transmission, routers, firewalls, switches, gateway computers and/or edge servers.

Each of the sets of external components 9000A,B can include a computer display monitor 902, a keyboard 903, and a computer mouse 934. External components 9000A,B can also include touch screens, virtual keyboards, touch pads, pointing devices, and other human interface devices. Each of the sets of internal components 8000A,B also includes device drivers 806 to interface to computer display monitor 902, keyboard 903 and computer mouse 934. The device drivers 806, R/W drive or interface 808 and network adapter or interface 836 comprise hardware and software (stored in storage device 803 and/or ROM 804).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 14:
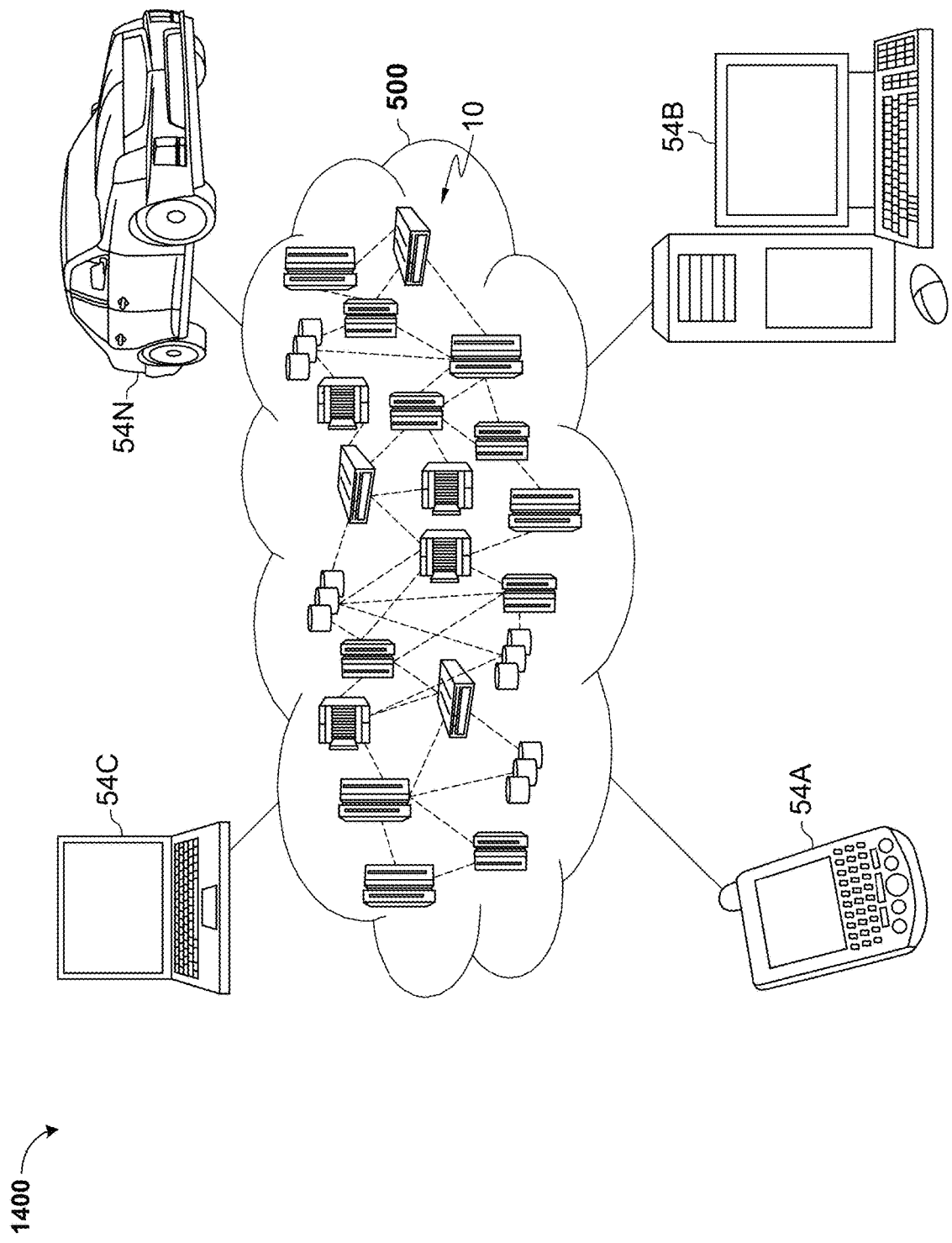
FIG. 14 is a block diagram of an illustrative cloud computing environment including the computer system depicted in FIG. 1, according to at least one embodiment.

Referring to FIG. 14, an illustrative cloud computing environment 1400 is depicted which may be suitable for implementing certain embodiments of the disclosed subject matter. As shown, cloud computing environment 1400 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 1500 to offer infrastructure, platforms and/or software as services for which a cloud consumer does not need to maintain resources on a local computing device. It is understood that the types of computing devices 54A-N shown in FIG. 14 are intended to be illustrative only and that cloud computing nodes 10 and cloud computing environment 1400 can communicate with any type of computerized device over any type of network and/or network addressable connection (e.g., using a web browser).

Figure 15:
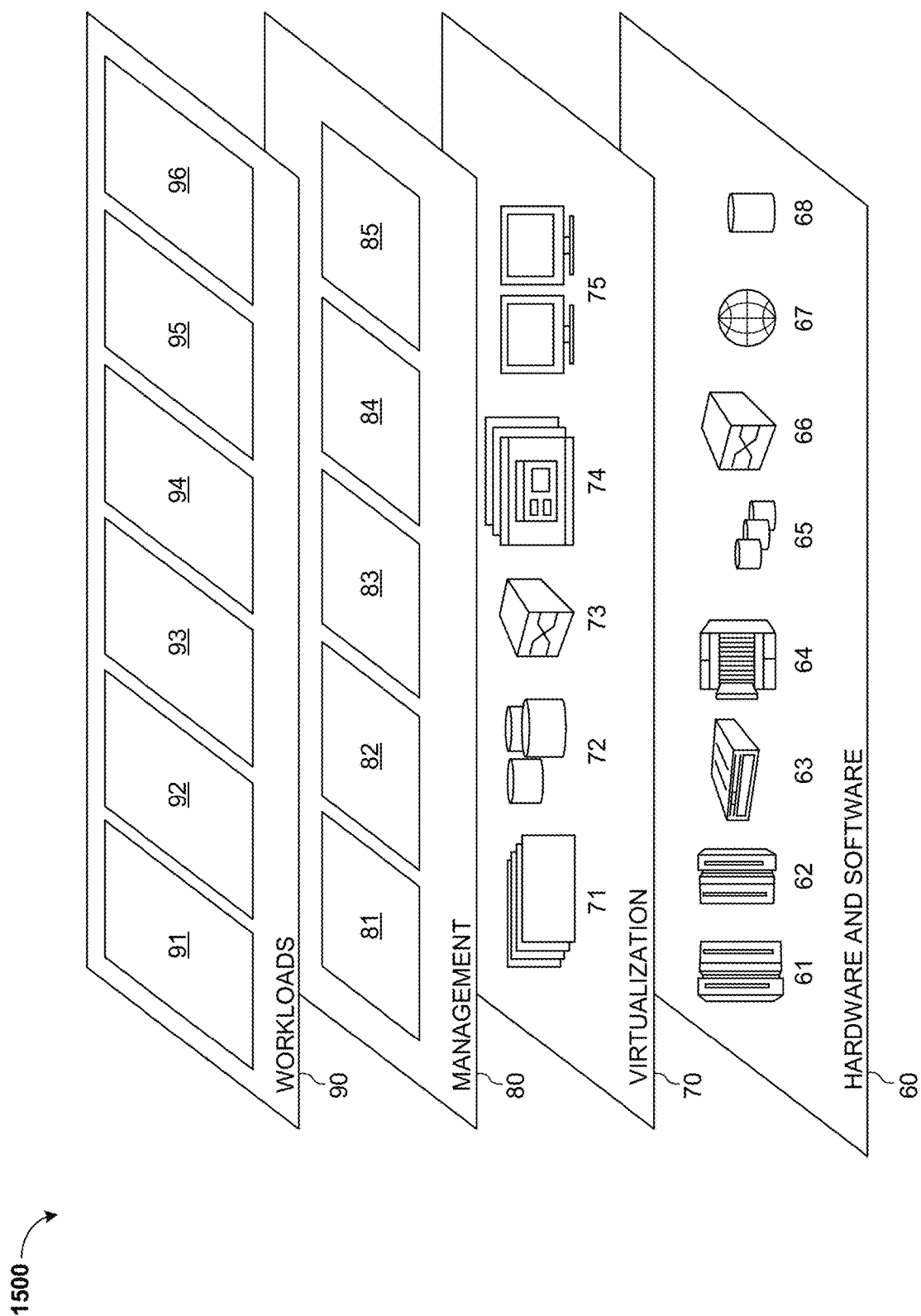
FIG. 15 is a block diagram of functional layers of the illustrative cloud computing environment of FIG. 14, according to at least one embodiment.

Referring to FIG. 15, a set of functional abstraction layers 1500 provided by cloud computing environment 1400 (FIG. 14) is shown. It should be understood in advance that the components, layers, and functions shown in FIG. 15 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Video Encoding/Decoding 96. Video Encoding/Decoding 96 may encode/decode video data using delta angles derived from nominal angles.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of video decoding using at least one processor,
    the method comprising:
    obtaining video data;
    parsing the obtained video data to obtain partitioning parameters;
    obtaining a partitioned coding block based on the partitioning parameters; and
    decoding the obtained video data based on the partitioned coding block,
    wherein the partitioned coding block is partitioned into a rectangular partition and at least one non-rectangular partition,
    wherein the at least one non-rectangular partition comprises a first L-shaped partition and a second L-shaped partition,
    wherein a sum of a length of a first side of the rectangular partition, a first side of the first L-shaped partition, and a first side of the second L-shaped partition is equal to a length of a first side of the partitioned coding block.

2. The method of claim 1, wherein the at least one non-rectangular partition comprises at least one L-shaped partition.

3. The method of claim 2, wherein a length of a first side of the at least one L-shaped partition is equal to a height of the partitioned coding block,
    wherein a length of a second side of the at least one L-shaped partition is equal to a width of the partitioned coding block,
    wherein a length of a third side of the at least one L-shaped partition is equal to half of the height of the partitioned coding block,
    wherein a length of a fourth side of the at least one L-shaped partition is equal to half of the width of the partitioned coding block,
    wherein a length of a fifth side of the at least one L-shaped partition is equal to the half of the height of the partitioned coding block,
    wherein a length of a sixth side of the at least one L-shaped partition is equal to the half of the width of the partitioned coding block.

4. The method of claim 2, wherein the at least one L-shaped partition comprises two L-shaped partitions.

5. The method of claim 2, wherein the at least one L-shaped partition comprises three L-shaped partitions.

6. The method of claim 2, wherein the rectangular partition is a square partition.

7. The method of claim 6, wherein a width of the square partition is equal to half of a width of the partitioned coding block, and
    wherein a height of the square partition is equal to half of a height of the partitioned coding block.

8. The method of claim 1, wherein an aspect ratio of the at least one non-rectangular partition is equal to an aspect ratio of the partitioned coding block.

9. The method of claim 1, wherein the rectangular partition is further partitioned based on at least one of binary tree partitioning, ternary tree partitioning, quadtree partitioning, or T-type partitioning.

10. The method of claim 1, wherein the at least one non-rectangular partition is further partitioned into a plurality of rectangular partitions.

11. A device for video decoding, the device comprising:
    at least one memory configured to store program code; and
    at least one processor configured to read the program code and operate as instructed by the program code, the program code including:
    first obtaining code configured to cause the at least one processor to obtain video data;
    parsing code configured to cause the at least one processor to parse the obtained video data to obtain partitioning parameters;
    second obtaining code configured to cause the at least one processor to obtain a partitioned coding block based on the partitioning parameters; and
    decoding code configured to cause the at least one processor to decode the obtained video data based on the partitioned coding block,
    wherein the partitioned coding block is partitioned into a rectangular partition and at least one non-rectangular partition,
    wherein the at least one non-rectangular partition comprises a first L-shaped partition and a second L-shaped partition,
    wherein a sum of a length of a first side of the rectangular partition, a first side of the first L-shaped partition, and a first side of the second L-shaped partition is equal to a length of a first side of the partitioned coding block.

12. The device of claim 11, wherein the at least one non-rectangular partition comprises at least one L-shaped partition.

13. The device of claim 12, wherein a length of a first side of the at least one L-shaped partition is equal to a height of the partitioned coding block,
    wherein a length of a second side of the at least one L-shaped partition is equal to a width of the partitioned coding block,
    wherein a length of a third side of the at least one L-shaped partition is equal to half of the height of the partitioned coding block,
    wherein a length of a fourth side of the at least one L-shaped partition is equal to half of the width of the partitioned coding block,
    wherein a length of a fifth side of the at least one L-shaped partition is equal to the half of the height of the partitioned coding block,
    wherein a length of a sixth side of the at least one L-shaped partition is equal to the half of the width of the partitioned coding block.

14. The device of claim 12, wherein the at least one L-shaped partition comprises two L-shaped partitions.

15. The device of claim 12, wherein the rectangular partition is a square partition.

16. The device of claim 15, wherein a width of the square partition is equal to half of a width of the partitioned coding block, and
    wherein a height of the square partition is equal to half of a height of the partitioned coding block.

17. The device of claim 11, wherein an aspect ratio of the at least one non-rectangular partition is equal to an aspect ratio of the partitioned coding block.

18. The device of claim 11, wherein the rectangular partition is further partitioned based on at least one of binary tree partitioning, ternary tree partitioning, quadtree partitioning, or T-type partitioning.

19. The device of claim 11, wherein the at least one non-rectangular partition is further partitioned into a plurality of rectangular partitions.

20. A non-transitory computer-readable medium storing instructions, the instructions comprising: one or more instructions that, when executed by one or more processors of a device for video decoding, cause the one or more processors to:
   obtain video data;
   parse the obtained video data to obtain partitioning parameters;
   obtain a partitioned coding block based on the partitioning parameters; and
   decode the obtained video data based on the partitioned coding block,
   wherein the partitioned coding block is partitioned into a rectangular partition and at least one non-rectangular partition,
   wherein the at least one non-rectangular partition comprises a first L-shaped partition and a second L-shaped partition,
   wherein a sum of a length of a first side of the rectangular partition, a first side of the first L-shaped partition, and a first side of the second L-shaped partition is equal to a length of a first side of the partitioned coding block.

21. The method of claim 1, wherein a sum of a length of a second side of the rectangular partition, a second side of the first L-shaped partition, and a second side of the second L-shaped partition is equal to a length of a second side of the partitioned coding block,
   wherein a length of a third side of the second L-shaped partition is equal to a length of a third side of the partitioned coding block, and
   wherein a length of a fourth side of the second L-shaped partition is equal to a length of a fourth side of the partitioned coding block.

* * * * *